United States Patent [19]

Taniguchi

[11] Patent Number: 4,554,454

[45] Date of Patent: Nov. 19, 1985

[54] OPTICAL SYSTEM FOR SCANNING WITH LASER BEAM

[75] Inventor: Yutaka Taniguchi, Kanagawa, Japan

[73] Assignee: Fuji Photo Film Co., Ltd., Kanagawa, Japan

[21] Appl. No.: 569,559

[22] Filed: Jan. 10, 1984

[30] Foreign Application Priority Data

Jan. 10, 1983 [JP] Japan ................................. 58-1951

[51] Int. Cl.[4] .............................................. G03C 5/16
[52] U.S. Cl. ............................................. 250/327.2
[58] Field of Search .................. 250/327.2, 347, 458.1, 250/461.1, 461.2, 484.1; 350/6.1, 6.8, 276 R, 350/277, 453

[56] References Cited

U.S. PATENT DOCUMENTS

| | | | |
|---|---|---|---|
| 3,975,637 | 8/1976 | Ikedo et al. | 250/327.2 |
| 4,269,518 | 5/1981 | Rahn | 350/276 SL |
| 4,276,473 | 6/1981 | Kato et al. | 250/327.2 |
| 4,408,826 | 10/1983 | Ike | 350/6.8 |

Primary Examiner—Alfred E. Smith
Attorney, Agent, or Firm—Sughrue, Mion, Zinn, Macpeak & Seas

[57] ABSTRACT

A scanning optical system comprises a gas laser beam source for emitting a laser beam which causes a stimulable phosphor sheet carrying a radiation image stored therein to release the stored energy of the radiation as light emission, optical members for scanning the stimulable phosphor sheet with the laser beam, and a beam expander positioned between the optical members and the gas laser beam source. The angle of incidence of the laser beam is adjusted by the optical members so that the direction of the incident laser beam is always different from the direction normal to the surface of the stimulable phosphor sheet. Thus the laser beam reflected by the stimulable phosphor sheet is prevented from being fed back along the same optical path as that of the incident laser beam.

4 Claims, 3 Drawing Figures

OPTICAL SYSTEM FOR SCANNING WITH LASER BEAM

BACKGROUND OF THE INVENTION

1. Field of the Invention

This invention relates to an optical system for scanning with a laser beam in a radiation image read-out system wherein a stimulable phosphor sheet carrying a radiation image stored therein is scanned with a laser beam emitted from a laser beam source to read out the radiation image stored in the stimulable phosphor sheet.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a phosphor sheet) is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

This radiation image recording and reproducing system using the stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desired density regardless of the amount of exposure of the phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

In the aforesaid radiation image recording and reproducing system, the read-out step for reading out the radiation image from the stimulable phosphor sheet carrying the radiation image stored therein is conducted by exposing the stimulable phosphor sheet to stimulating rays which cause it to emit light in proportion to the stored energy of the radiation, and photoelectrically detecting the emitted light. Typically, the read-out step is conducted by two-dimensionally scanning the stimulable phosphor sheet with a light beam such as a laser beam which causes it to emit light in proportion to the stored energy of the radiation, and sequentially detecting the emitted light and converting it into an image signal by use of a photodetector such as a photomultiplier. In this case, the two-dimensional scanning is carried out by scanning the stimulable phosphor sheet with the light beam in a main scanning direction and a sub-scanning direction. For this purpose, use is made of a scanning optical system in which the stimulable phosphor sheet is moved in one direction and, at the same time, scanned with the light beam in the direction normal to the moving direction of the stimulable phosphor sheet, or a scanning optical system wherein the stimulable phosphor sheet is maintained stationary and scanned with the light beam in both the main scanning direction and the sub-scanning direction.

In the above-described radiation image read-out system, a gas laser tube (including a gas ion laser tube) emitting an Ar+ laser beam, a Kr+ laser beam, an He-Ne laser beam, or the like is normally used as the laser beam source. In a system using the gas laser tube as a light source, spherical mirrors are used as a resonator for convenience of operation, i.e. for facilitating oscillation. When the spherical mirrors are positioned in confocal relation to each other (i.e. when the spherical mirrors are positioned face to face so that the focal points thereof coincide with each other), the divergence angle $\theta_0$ (radian) of the gas laser beam is approximately represented by $$\theta_0 \simeq \frac{2\lambda}{\pi W_0}$$

wherein $$W_0 = \sqrt{\frac{\lambda d}{2\pi}},$$

d denotes the distance between the mirrors, and λ designates the wavelength of the laser beam. In general, the divergence angle $\theta_0$ of the gas laser beam is very much smaller than the divergence angle of a semiconductor laser beam. On the other hand, in order to improve the final image forming effect, it is necessary that the laser beam impinging upon an image forming lens be diverged. In the system using the gas laser tube as the light source, since the divergence angle $\theta_0$ of the laser beam is small as described above, a beam expander is inserted between the gas laser tube and the image forming lens to expand the beam diameter of the laser beam. The beam expander normally comprises a combination of two convex lenses, and the beam diameter of the laser beam incident on the beam expander is expanded by the beam expander to an extent depending on the ratio between the focal lengths of the convex lenses.

However, in the radiation image read-out system as described above, since the surface of the stimulable phosphor sheet is formed by a smooth surface exhibiting a reflectivity of about 4%, the laser beam emitted from the gas laser tube to the stimulable phosphor sheet is reflected by the surface of the stimulable phosphor sheet, and a part of the reflected laser beam returns back to the gas laser tube. As a result, oscillation of the gas laser tube becomes inconsistent, and the laser beam output is disturbed. Therefore, the image quality of the finally read-out image is adversely affected. Further, in the aforesaid system, since the beam expander is used, the laser beam reflected from the stimulable phosphor sheet is again reflected by the lenses of the beam expander to the stimulable phosphor sheet. This also adversely affects the image quality of the finally read-out image.

FIG. 1 schematically shows the above-mentioned condition in the conventional radiation image read-out system. A laser beam emitted from a gas laser tube 1 is expanded by a beam expander 2 and then converged by an image forming lens (not shown). The converged laser beam is directed by a scanning optical member 3 such as a galvanometer mirror via a reflection mirror 4 onto the surface of a stimulable phosphor sheet 5. When the laser beam is directed by the scanning optical member 3 along the optical path A or C onto an end portion of a scan line on the stimulable phosphor sheet 5, the angle $\phi'$ or $\phi''$ of the incident light with respect to the surface of the stimulable phosphor sheet 5 in a plane 7 in which the incident light beams along the optical paths A and C lie is different from and far apart from 90°. In this case, therefore, the laser beam reflected from the surface of the stimulable phosphor sheet 5 does not go along the same optical path as that of the incident light. On the other hand, when the laser beam is directed by the scanning optical member 3 along the optical path B onto the middle point of a scan line on the stimulable phosphor sheet 5, the angle $\phi$ of the incident light with respect to the surface of the stimulable phosphor sheet 5 in the plane 7 is equal to 90°. In this case, when the angle $\theta$ of the incident light with respect to the surface of the stimulable phosphor sheet 5 in the direction 8 normal to the scanning direction indicated by the arrow 6 also becomes equal to 90°, the light reflected from the surface of the stimulable phosphor sheet 5 advances along the same optical path as that of the incident light. A part of the reflected light returning along the optical path B is reflected by a convex lens 9 positioned on the stimulable phosphor sheet side of the beam expander 2. Thus the reflected light again impinges upon the stimulable phosphor sheet 5, and causes a disturbance in the finally read-out image. Further, a part of the reflected light returning from the stimulable phosphor sheet 5 along the optical path B passes through the beam expander 2 to the gas laser tube 1, and renders the oscillation of the gas laser tube 1 inconsistent. Accordingly, the laser beam output of the gas laser tube 1 becomes inconsistent, and the image quality of the finally read-out image is adversely affected. FIG. 2 is a side view showing the reflection mirror 4 and the stimulable phosphor sheet 5 in FIG. 1, as viewed in the scanning direction indicated by the arrow D.

The adverse effects of the reflected light as described above present a very real problem in the aforesaid radiation image recording and reproducing system which is required to reproduce a radiation image having a high image quality, particularly a high diagnostic efficiency and accuracy.

In order to solve the above-mentioned problem, it has heretofore been known, for example, to insert a polarizing plate and a quarter wave plate between the beam expander and the scanning mirror. In this method, a linearly polarized laser beam emitted from a gas laser tube is passed through the polarizer the polarization axis of which is aligned with that of the linearly polarized laser beam, and then passed through the quarter wave plate to yield elliptically polarized light. When the elliptically polarized light is reflected by the surface of a stimulable phosphor sheet and returned along the same optical path as that of the elliptically polarized light incident on the stimulable phosphor sheet, the elliptically polarized light thus reflected is passed again through the quarter wave plate and converted thereby to linear polarized light. However, since the plane of polarization of the reflected linear polarized light is rotated by 90° with respect to the plane of polarization of the original incident linear polarized light, the reflected linear polarized light is shielded by the polarizer and is not fed back to the beam expander and the gas laser tube.

The method just described is nevertheless disadvantageous since, because of the insertion of the optical members such as the polarizer and the quarter wave plate in the optical system, it takes much time for optical adjustment to be carried out, and the cost of the system becomes high.

SUMMARY OF THE INVENTION

The primary object of the present invention is to provide an optical system for scanning with a laser beam in a radiation image read-out system, which prevents light reflected by the surface of a stimulable phosphor sheet from being fed back to a beam expander or a gas laser tube without using optical members for prevention of the feedback of the reflected light in the optical system.

Another object of the present invention is to provide an optical system for scanning with a laser beam in a radiation image read-out system, which shortens the time required for optical adjustment and reduces the manufacture cost.

The optical system for scanning with a laser beam in accordance with the present invention is characterized by adjusting the angle of an incident laser beam, which is emitted from a gas laser tube, passed through a beam expander and directed by scanning optical members onto the surface of a stimulable phosphor sheet, with respect to the surface of the stimulable phosphor sheet to an appropriate angle so that the direction of the incident laser beam is always different from the direction normal to the surface of the stimulable phosphor sheet.

In the present invention, since the optical path of the laser beam reflected by the surface of the stimulable phosphor sheet becomes different from the optical path of the incident laser beam, the reflected laser beam is not fed back to the beam expander and the gas laser tube. Accordingly, the image quality of the finally read-out image is not adversely affected by the reflected laser beam, but instead it becomes possible to obtain a final image of a high image quality. Also, since it is not necessary to insert optical members for prevention of the feedback of the reflected light in the optical system, it becomes possible to shorten the time required for optical adjustment and reduce the cost of manufacturing the system.

Though the optical system for scanning with a laser beam in accordance with the present invention is concerned with the optical system in the radiation image read-out system using a stimulable phosphor sheet, the optical system of the present invention can also be applied to a radiation image recording apparatus using a gas laser tube and a beam expander, or to other optical systems.

By "an appropriate angle" is meant any angle different from 90° insofar as the laser beam reflected from the surface of the stimulable phosphor sheet is not fed back along the same optical path as that of the incident laser beam.

DESCRIPTION OF THE PREFERRED EMBODIMENTS

The present invention will hereinbelow be described in further detail with reference to the accompanying drawings.

Figure 1:
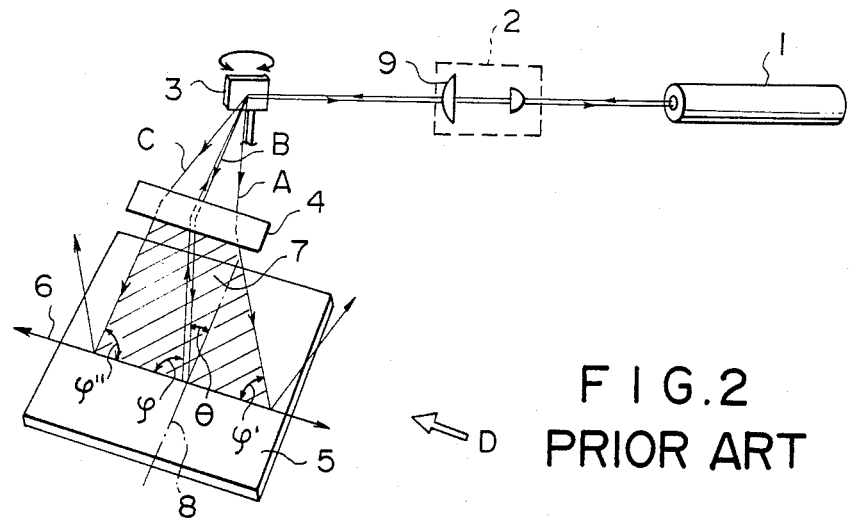
FIG. 1 is a schematic view showing the conventional radiation image read-out system.
Figure 2:
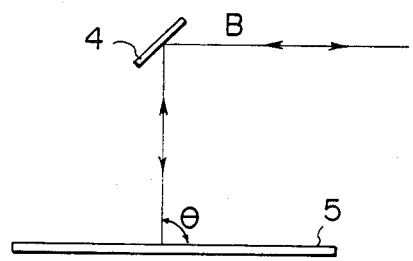
FIG. 2 is a side view showing a part of the conventional radiation image read-out system of FIG. 1, as viewed in the direction indicated by the arrow D.
Figure 3:
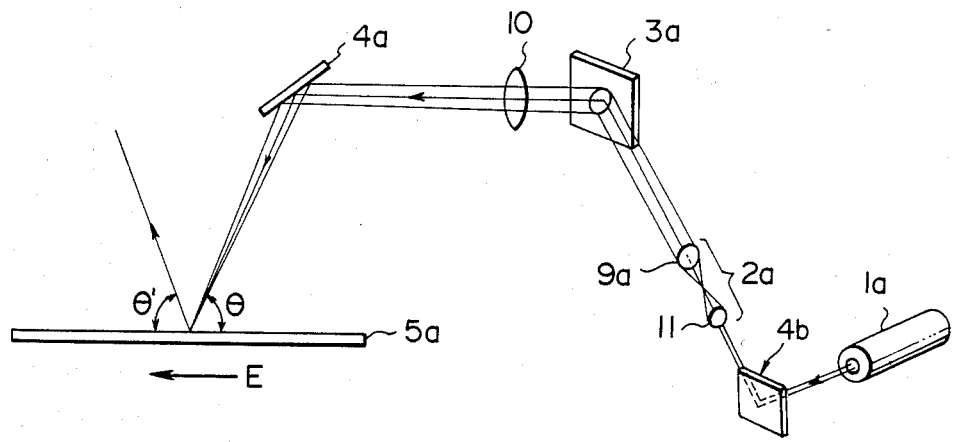
FIG. 3 is a schematic view showing an embodiment of the optical system for scanning with a laser beam in accordance with the present invention.

Referring to FIG. 3 showing an embodiment of the optical system for scanning with a laser beam in accordance with the present invention, the beam diameter of a laser beam emitted from a gas laser tube 1a is expanded by a beam expander 2a, and then the laser beam is reflected from mirror 4b and is converged by an image forming lens 10. The reason why the beam diameter is expanded by the beam expander 2a is that the diameter of the light spot finally formed on a stimulable phosphor sheet 5a should be shaped. The beam expander 2a normally comprises two convex lenses 9a and 11. The focal length $f_2$ of the convex lens 9a positioned on the stimulable phosphor sheet 5a side is larger than the focal length $f_1$ of the convex lens 11 positioned on the gas laser tube 1a side. When the laser beam incident on the convex lens 11 has a beam diameter $D_1$, the beam diameter $D_2$ of the laser beam coming out of the convex lens 9a is represented by the formula $$D_2 = \frac{f_2}{f_1} \cdot D_1.$$

The laser beam directed by a galvanometer mirror 3a in the main scanning direction is converged by the image forming lens 10, and reflected by a reflection mirror 4a onto the stimulable phosphor sheet 5a. In FIG. 3, the main scanning direction is the direction normal to the surface of the drawing sheet. While the laser beam impinges upon the stimulable phosphor sheet 5a, the phosphor sheet 5a is moved by a subscanning means (not shown) such as a step motor in the subscanning direction indicated by the arrow E normal to the main scanning direction. In FIG. 3 is shown the incident optical path of the laser beam incident in the direction normal to the main scanning direction on the stimulable phosphor sheet 5a.

As shown in FIG. 3, in this embodiment, even when the laser beam is incident on the stimulable phosphor sheet 5a in the direction normal to the main scanning direction on the stimulable phosphor sheet 5a, the angle $\theta$ of the incident laser beam with respect to the surface of the stimulable phosphor sheet 5a in the sub-scanning direction normal to the main scanning direction is different from 90°. Therefore, the laser beam reflected from the surface of the stimulable phosphor sheet 5a does not advance along the same optical path as that of the incident light. In this case, the angle $\theta$ of the incident light with respect to the surface of the stimulable phosphor sheet 5a and the angle $\theta$ of the reflected light with respect thereto become equal to each other. However, when $\theta \neq 90°$, the reflected light does not advance along the same optical path as that of the incident light.

As described above, in this embodiment, the reflected light is never fed back to the beam expander 2a or the gas laser tube 1a. Accordingly, there is no risk of the reflected light being again reflected by the lens 9a and/or the lens 11 of the beam expander 2a onto the stimulable phosphor sheet 5a nor a risk of the reflected light rendering the oscillation of the gas laser tube 1a inconsistent. Therefore, in the radiation image read-out system employing this embodiment, the image quality of the finally read-out image is not adversely affected by the reflected light, but instead it becomes possible to obtain an image of a high image quality.

In the case where a polarizing plate and a quarter wave plate are inserted to shield the reflected light according to the conventional procedure, much time is required for the optical adjustment for aligning the optical axes with each other, or the like, to be carried out, and it is necessary to make jigs for the optical adjustment. However, in the aforesaid embodiment of the present invention, since the optical members for prevention of the reflected light are not used in the optical system, it becomes possible to shorten the time required for the optical adjustment. Since it is usually necessary to conduct the optical adjustment not only when initially assembling the optical system but also when eliminating an error during the use of the optical system, the effect of the aforesaid embodiment of the present invention on shortening of the optical adjustment time is very advantageous in practical use. Further, in the embodiment of the present invention, since the optical members for prevention of the reflected light need not be used, it becomes possible to reduce the cost of manufacturing the system.

In the embodiment of FIG. 3, the angle $\theta$ of the incident laser beam with respect to the stimulable phosphor sheet 5a is adjusted to an angle different from 90° by adjusting the position and the angle of the reflection mirror 4a. However, it is also possible to obtain a desired angle $\theta$ of the laser beam incident on the stimulable phosphor sheet 5a by adjusting the position of the stimulable phosphor sheet 5a in the sub-scanning direction.

In general, the diameter of the light spot formed on the stimulable phosphor sheet 5a becomes larger and the resolution becomes lower as the angle $\theta$ of the incident laser beam with respect to the stimulable phosphor sheet 5a is decreased. Also, the portion of the reflected light which is fed back along the same optical path as that of the incident light becomes larger as the angle $\theta$ is increased closer to 90° in the vicinity of 90°. Therefore, the angle $\theta$ must be selected according to the condition of the optical system for scanning with the laser beam.

I claim:

1. An optical system for scanning with a laser beam in a radiation image read-out system, comprising: a stimulable phosphor sheet carrying a radiation image stored therein, a gas laser beam source for emitting a gas laser beam which stimulates said stimulable phosphor sheet to release the radiation energy stored therein as light emission, scanning optical members for scanning the surface of said stimulable phosphor sheet with said laser beam emitted from said gas laser beam source, and a beam expander positioned between said scanning optical members and said gas laser beam source for adjusting the beam diameter of said laser beam, wherein the angle of the incident laser beam, which is directed by said scanning optical members onto the surface of said stimulable phosphor sheet, is set with respect to the surface of said stimulable phosphor sheet to an appropriate angle so that the direction of said incident laser beam is always different from the direction normal to the surface of said stimulable phosphor sheet, whereby the laser reflected by the surface of said stimulable phosphor sheet is prevented from being fed back along the same optical path as the optical path of said incident laser beam.

2. An optical system as defined in claim 1 wherein said scanning optical members comprise a galvanometer mirror, an image forming lens and a reflection mirror.

3. An optical system as defined in claim 2 wherein said angle of the incident laser beam with respect to the surface of said stimulable phosphor sheet is adjusted by adjusting the position and the angle of said reflection mirror.

4. An optical system as defined in claim 1 wherein said beam expander comprises two convex lenses.

* * * * *